(12) United States Patent
Yamaguchi et al.

(10) Patent No.: US 10,168,059 B2
(45) Date of Patent: Jan. 1, 2019

(54) FILTERING MEDIUM AND AIR PURIFIER

(71) Applicant: Panasonic Intellectual Property Management Co., Ltd., Osaka (JP)

(72) Inventors: Takayoshi Yamaguchi, Osaka (JP); Tadashi Maeda, Osaka (JP); Yosuke Wada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 15/228,206

(22) Filed: Aug. 4, 2016

(65) Prior Publication Data

US 2017/0072406 A1 Mar. 16, 2017

(30) Foreign Application Priority Data

Sep. 11, 2015 (JP) ................................. 2015-179866
Sep. 11, 2015 (JP) ................................. 2015-179867

(51) Int. Cl.
| | |
|---|---|
| *B03C 3/155* | (2006.01) |
| *F24F 3/16* | (2006.01) |
| *B03C 3/09* | (2006.01) |
| *B01D 46/00* | (2006.01) |
| *B01D 46/52* | (2006.01) |

(52) U.S. Cl.
CPC .......... *F24F 3/166* (2013.01); *B01D 46/0032* (2013.01); *B01D 46/521* (2013.01); *B03C 3/09* (2013.01); *B03C 3/155* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,868,319 | A | * | 1/1959 | Rivers ..................... | B03C 3/155 96/67 |
| 3,449,094 | A | * | 6/1969 | Baxt ........................ | A24D 3/16 131/333 |
| 4,133,653 | A | * | 1/1979 | Soltis ........................ | B03C 3/40 96/58 |
| 4,828,586 | A | * | 5/1989 | Joannou .................. | B03C 3/155 96/66 |
| 4,886,526 | A | | 12/1989 | Joannou | |
| 4,886,527 | A | * | 12/1989 | Fottinger ............. | B01D 39/083 95/78 |

(Continued)

FOREIGN PATENT DOCUMENTS

| | | |
|---|---|---|
| JP | 63-036852 A | 2/1988 |
| JP | S64-56157 A | 3/1989 |

(Continued)

*Primary Examiner* — Duane Smith
*Assistant Examiner* — Sonji Turner
(74) *Attorney, Agent, or Firm* — Pearne & Gordon LLP

(57) ABSTRACT

A filtering medium includes a nonwoven fabric and a first electrode having an input terminal of power. The first electrode is provided on a surface of the nonwoven fabric. Alternatively, in a case where the nonwoven fabric has a plurality of fiber layers, the first electrode may be provided between the fiber layers. An air purifier includes the filtering medium disposed between a sucker and a discharger of a gas, and an output terminal via which power is output to the first electrode of the filtering medium.

21 Claims, 5 Drawing Sheets

(56) References Cited

U.S. PATENT DOCUMENTS

| | | | | |
|---|---|---|---|---|
| 4,902,306 A * | 2/1990 | Burnett | B03C 3/155 | 55/486 |
| 4,944,778 A * | 7/1990 | Yanagawa | B01D 39/083 | 95/78 |
| 4,978,372 A * | 12/1990 | Pick | B03C 3/155 | 96/67 |
| 4,983,193 A * | 1/1991 | Tani | B01D 46/10 | 55/487 |
| 5,573,577 A * | 11/1996 | Joannou | B03C 3/155 | 96/66 |
| 5,989,320 A * | 11/1999 | Rutkowski | B01D 46/0032 | 96/55 |
| 6,077,334 A * | 6/2000 | Joannou | B03C 3/155 | 96/66 |
| 6,294,004 B1 * | 9/2001 | Summers | B03C 3/025 | 55/493 |
| 6,491,743 B1 * | 12/2002 | Joannou | B03C 3/155 | 55/521 |
| 6,527,834 B1 * | 3/2003 | Jorder | B01D 39/083 | 95/78 |
| 6,858,057 B2 * | 2/2005 | Healey | B01D 39/1623 | 264/169 |
| 7,004,995 B2 * | 2/2006 | Schroder | B01D 46/0032 | 55/524 |
| 7,691,186 B2 * | 4/2010 | Wiser | B03C 3/64 | 55/382 |
| 8,409,336 B2 * | 4/2013 | Gatchell | A61L 2/03 | 55/497 |
| 8,721,775 B2 * | 5/2014 | Chesebrough | B03C 3/09 | 96/66 |
| 9,138,669 B2 * | 9/2015 | Leung | B01D 39/1623 | |
| 9,943,796 B2 * | 4/2018 | Ptak | B01D 46/10 | |
| 2003/0033935 A1 * | 2/2003 | Hu | B01D 39/1623 | 96/11 |
| 2005/0026526 A1 * | 2/2005 | Verdegan | B01D 39/16 | 442/340 |
| 2006/0137527 A1 * | 6/2006 | Joannou | B03C 3/155 | 96/66 |
| 2007/0028767 A1 * | 2/2007 | Choi | B01D 39/1692 | 95/59 |
| 2007/0227359 A1 * | 10/2007 | Choi | B01D 39/163 | 96/11 |
| 2013/0276417 A1 * | 10/2013 | Winters | B03C 3/025 | 55/493 |

FOREIGN PATENT DOCUMENTS

| | | |
|---|---|---|
| JP | 8-033856 A | 2/1996 |
| JP | 08033856 * | 2/1996 |
| JP | 2013-031828 A | 2/2013 |
| JP | 2014-064969 | 4/2014 |
| JP | 2014-133200 A | 7/2014 |

* cited by examiner

FILTERING MEDIUM AND AIR PURIFIER

BACKGROUND

1. Technical Field

The present disclosure relates to a filtering medium having a nonwoven fabric and an air purifier including the filtering medium.

2. Description of the Related Art

As a filtering medium for collecting dust, used in an air purifier and the like, a filtering medium using a nonwoven fabric containing charged electret fibers has been proposed. The electret fibers contain electret-formed dielectrics. An electric field does not occur in the electret-formed dielectrics, but dielectric polarization remains therein. A nonwoven fabric containing the electret fibers physically captures dust not only due to a gap between fibers but also due to electrostatic force, and can thus increase a dust collection effect of the nonwoven fabric.

SUMMARY

A filtering medium according to an aspect of the present disclosure includes a nonwoven fabric and a first electrode provided on a surface of the nonwoven fabric. The first electrode has an input terminal of power.

A filtering medium according to another aspect of the present disclosure includes a laminated nonwoven fabric provided with a plurality of fiber layers, and a first electrode provided between the plurality of layers of the laminated nonwoven fabric. The first electrode has an input terminal of power.

An air purifier according to still another aspect of the present disclosure includes a sucker of a gas, a discharger of the gas, one of the filter media, and an output terminal via which power is output to the first electrode of the filtering medium. The filtering medium is disposed between the sucker and the discharger.

According to the present disclosure, it is possible to provide a filtering medium capable of maintaining a dust collection effect using an electrostatic force for a long period of time by using a cheaper nonwoven fabric, and an air purifier including the filtering medium.

DETAILED DESCRIPTIONS OF PREFERRED EMBODIMENTS

Figure 1:
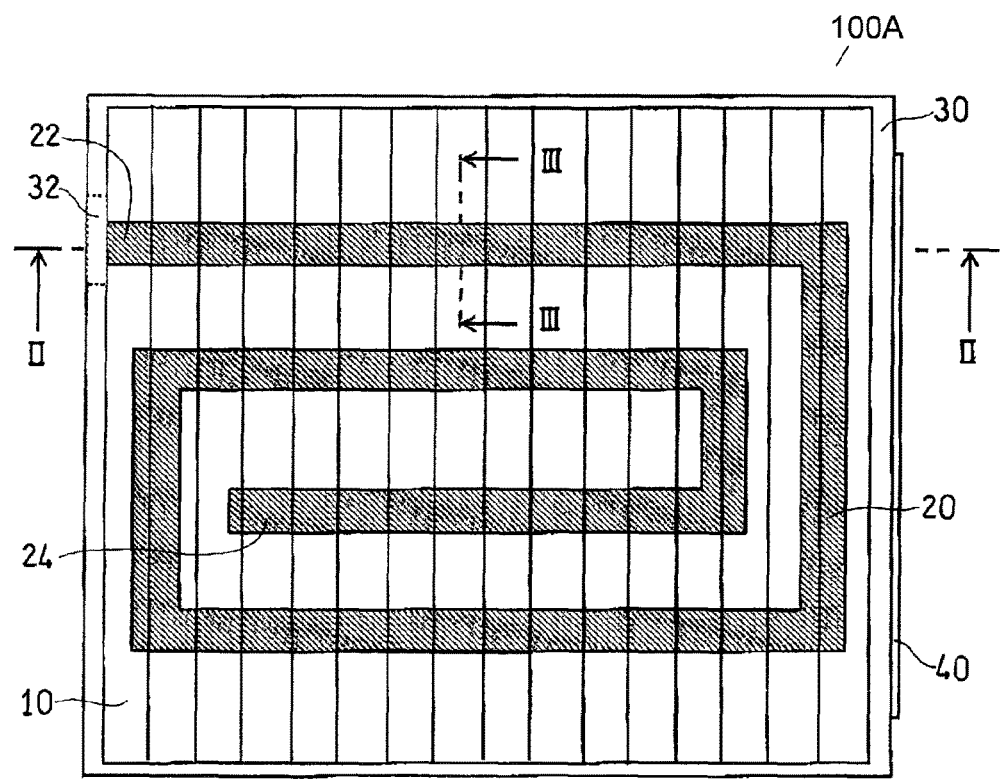
FIG. 1 is a plan view conceptually illustrating a structure of a filtering medium according to Embodiment 1 of the present disclosure.

Prior to description of embodiments of the present disclosure, problems of an air purifier of the related art will be described briefly. If electret fibers are covered with dust, an electrostatic force disappears, and thus performance of adsorbing the dust is considerably reduced. A nonwoven fabric containing electret fibers is more expensive than a nonwoven fabric not containing electret fibers.

Hereinafter, embodiments of the present disclosure will be described with reference to the drawings. In Embodiments 2 and 3, the same constituent elements as in the previous embodiment are given the same reference numerals, and detailed description thereof may be omitted.

Embodiment 1

A filtering medium according to Embodiment 1 of the present disclosure includes a nonwoven fabric, and a first electrode provided on a surface of the nonwoven fabric, the first electrode having an input terminal of power. Power is input from the input terminal of the first electrode, and thus the nonwoven fabric can be charged along with the first electrode. Therefore, even in a case where the nonwoven fabric does not contain electret fibers, fibers forming the nonwoven fabric can capture dust by using an electrostatic force. The nonwoven fabric forming the filtering medium may or may not contain electret fibers.

Since power is continuously input to the first electrode via the input terminal, dust itself is charged even after the fibers are covered with the dust. Therefore, it is possible to maintain a dust collection effect using the electrostatic force for a long period of time. A position of the input terminal is not particularly limited, and any location in the exposed first electrode may be used as the input terminal.

In order to charge the first electrode, an open end may be provided in the first electrode so that a current does not substantially flow through the first electrode. In this case, typically, the first electrode forms an open circuit, and thus a current does not substantially flow through the first electrode even if power is input via the input terminal.

An output terminal may be provided in the first electrode, and a high resistor may also be connected to the output terminal. For example, if a voltage of the input terminal is 100 V, a high resistor with a resistance value of 1 MΩ or more may be used. Consequently, a current value can be set to be 0.5 mA or less which is regarded as not being sensed by a person. However, if a weak current continuously flows through the high resistor, heat may be generated therefrom. Therefore, the high resistor is preferably provided outside the filtering medium.

The first electrode may be formed only by disposing a conductive material on the surface of the nonwoven fabric. This work is easily performed, and thus it is possible to prevent an increase in manufacturing cost of the filtering medium. As the first electrode, a cheap metal foil may be used. For example, the first electrode may be formed by sticking the metal foil to the surface of the nonwoven fabric by using an adhesive. However, from the viewpoint of increasing the bonding strength between the nonwoven fabric and the first electrode, the first electrode is preferably formed by using conductive particles. For example, an ink (or a paste) containing conductive particles may be applied on the surface of the nonwoven fabric and may then be dried so as to form the first electrode. A method of applying the ink on the nonwoven fabric is not particularly limited, and, for example, the ink may be printed on the surface of the nonwoven fabric.

At least a part of the first electrode preferably penetrates into voids of the nonwoven fabric from the surface of the nonwoven fabric provided with the first electrode. Consequently, the first electrode is reliably fixed to the nonwoven fabric and is thus hardly peeled off. Therefore, the filtering medium may be folded or bent, and thus the filtering medium is easily subject to pleating. In a case where the first electrode is formed by using conductive particles, it becomes easier to cause the first electrode to penetrate into the voids of the nonwoven fabric.

The filtering medium according to the present embodiment may further include a second electrode. In this case, the first electrode and the second electrode are insulated from each other by sandwiching the nonwoven fabric between the first electrode and the second electrode, or a high resistor is connected between the first electrode and the second electrode, and thus the second electrode has a potential which is different from a potential of the first electrode. The second electrode is provided, and thus the safety when treating the filtering medium and an apparatus (an air purifier or the like) having the filtering medium built thereinto is improved. The second electrode may be grounded. Consequently, the safety is further improved. In a case where the second electrode is grounded, the second electrode may be connected to a ground line of an apparatus to which the filtering medium is attached.

For example, in a case where the first electrode has negative electric charge, and the second electrode has positive electric charge, dust receiving the negative electric charge in the first electrode may be captured at or around the second electrode. Therefore, a dust collection effect is improved.

The filtering medium may further include a fixing tool (for example, a frame for fixing the periphery of the nonwoven fabric) for fixing the nonwoven fabric. The fixing tool or the frame is provided, and thus the filtering medium is easily attached to an apparatus such as an air purifier.

The nonwoven fabric may be a laminated nonwoven fabric having a plurality of fiber layers. The laminated nonwoven fabric preferably has, for example, a first fiber layer and a second fiber layer denser than the first fiber layer. Consequently, the first fiber layer can be made to mainly function as a base material holding the mechanical strength of the filtering medium. On the other hand, the dense second fiber layer may mainly have a dust collection function of capturing dust.

The second electrode may be provided on a surface of the nonwoven fabric on an opposite side to the surface on which the first electrode is provided, and may be provided between a plurality of fiber layers. The second electrode may be provided along the periphery of the first electrode. In this case, the second electrode may be fixed to a frame.

The first electrode is more easily joined to the dense second fiber layer than the first fiber layer. Therefore, in a case where the laminated nonwoven fabric is used, the first electrode is preferably provided on an outer surface of the second fiber layer. This is so that the first electrode is hardly peeled off out of the nonwoven fabric, or the first electrode is hardly disconnected. In a case where an ink containing conductive particles is applied on the outer surface of the second fiber layer, it is easy to control the extent of penetration of the ink into the nonwoven fabric. The outer surface is not a surface corresponding to a boundary with another fiber layer but is an open surface.

The laminated nonwoven fabric may further have a third fiber layer containing fibers having a fiber diameter smaller than that of the fibers forming the second fiber layer. The third fiber layer may have a function of capturing minute dust. Consequently, it is easy to keep a balance between pressure loss and dust collection efficiency. The third fiber layer is preferably formed of, for example, nanofibers having a fiber diameter of less than 1 In this case, the strength of the third fiber layer is low, but the third fiber layer is sandwiched between the first fiber layer and the second fiber layer, and thus the third fiber layer can be protected. Note that the expression that a nonwoven fabric contains fibers means that the nonwoven contains the fibers as main components, and the content of the main components is 80 weight % or greater. For example, the third fiber layer may contain fibers having a fiber diameter smaller than that of the fibers forming the second fiber layer, as main components.

Materials of the fibers forming the first fiber layer and/or the second fiber layer preferably include polyolefin, polyester, polyamide (PA), cellulose, and the like. These materials may be used alone or in combination of a plurality of kinds thereof. This is because these materials are easily charged and can increase a dust collection effect using an electrostatic force. Materials of the fibers forming the third fiber layer preferably include polyethersulfone (PES), polyvinylidene fluoride (PVDF), polyimide (PI), polyamideimide (PAI), polyurethane (PU), and the like. These materials may be used alone or in combination of a plurality of kinds thereof.

The filtering medium according to the present embodiment may be used in an air purifier including a sucker of a gas, a discharger of the gas, and a filtering medium disposed between the sucker and the discharger. The air purifier has an output terminal from which power is output to the input terminal of the first electrode. A voltage is applied to the input terminal of the first electrode via the output terminal so that the first electrode is charged, and thus the nonwoven fabric is charged. The power input via the input terminal is preferably DC power so that a reverse potential does not occur. In a case where the filtering medium has a second electrode, the air purifier is preferably further provided with a ground line connected to the second electrode.

Hereinafter, the present embodiment will be described with reference to the drawings. However, the present disclosure is not limited to the following embodiment.

Figure 2:
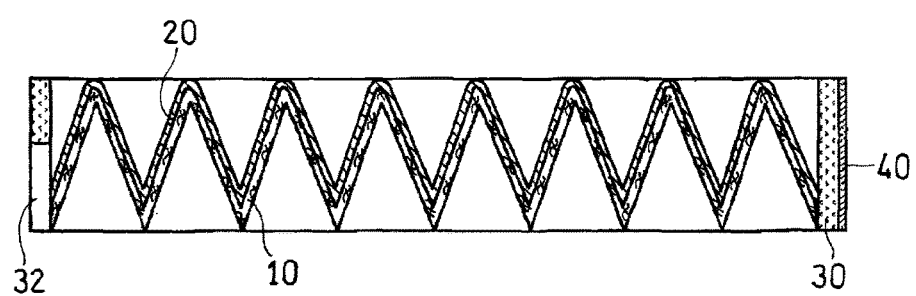
FIG. 2 is a sectional view taken along line II-II in the filtering medium illustrated in FIG. 1.

FIG. 1 is a plan view conceptually illustrating a structure of a filtering medium according to Embodiment 1 of the present disclosure; FIG. 2 is a sectional view taken along line II-II in FIG. 1; and FIG. 3 is a sectional view taken along line in FIG. 1.

Filtering medium 100A includes nonwoven fabric 10, and first electrode 20 provided on a surface of nonwoven fabric 10. As illustrated in FIG. 1, first electrode 20 has input terminal 22 of power and open end 24. As illustrated in FIG. 2, nonwoven fabric 10 is folded along with first electrode 20 formed on the surface thereof and is pleated.

Figure 3:
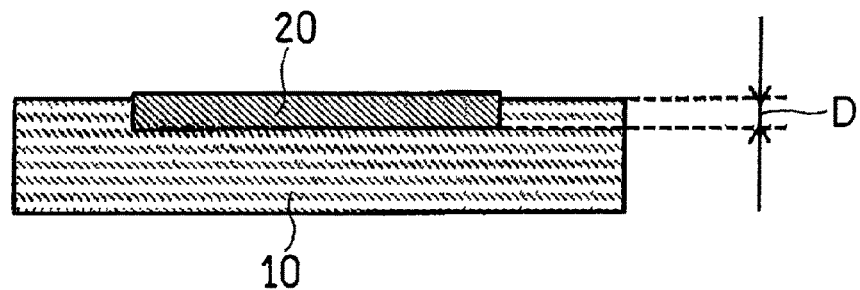
FIG. 3 is a sectional view taken along line in the filtering medium illustrated in FIG. 1.

As illustrated in FIG. 3, a part of first electrode 20 penetrates into voids between fibers forming nonwoven fabric 10 from the surface of nonwoven fabric 10 provided with first electrode 20. In other words, a part of the conductive material forming first electrode 20 is combined with the fibers forming nonwoven fabric 10. Therefore, nonwoven fabric 10 is easily influenced by a potential of first electrode 20, and, if first electrode 20 is charged, nonwoven fabric 10 is also charged.

Filtering medium 100A is fixed to frame 30 surrounding the periphery of nonwoven fabric 10. Frame 30 is preferably made of a nonconductive material from the viewpoint of preventing disconnection from the first or second electrode, and is made of, for example, plastic such as polypropylene or polyethylene, or paper. In a case where frame 30 is made of metal, frame 30 may be regarded as second electrode 40 to be described later.

Filtering medium 100A includes second electrode 40, and second electrode 40 is fixed to one side of frame 30. Therefore, nonwoven fabric 10 is not covered with second electrode 40, and thus second electrode 40 does not hinder dust collection. Second electrode 40 is completely insulated from first electrode 20 via nonwoven fabric 10 and frame 30.

Opening 32 into which an output terminal (not illustrated) of a power source line of an apparatus such as an air purifier is inserted is provided on another side of frame 30 so as to correspond to input terminal 22 of first electrode 20. If frame 30 is attached to the apparatus, the output terminal of the apparatus is in contact with input terminal 22 of first electrode 20. In this case, second electrode 40 is in contact with a ground line provided in the apparatus.

Next, nonwoven fabric 10 will be described in detail. As illustrated in FIG. 3, nonwoven fabric 10 may be a single fiber layer, and may be a laminated nonwoven fabric having a plurality of fiber layers as in modification examples illustrated in FIGS. 4 and 5. In other words, laminated nonwoven fabric 10A or 10B may be used instead of single-layered nonwoven fabric 10. A nonwoven fabric formed of a single fiber layer is easily manufactured, and thus a filtering medium can be manufactured at low cost. However, a laminated nonwoven fabric is preferably used from the viewpoint of reducing pressure loss as much as possible and increasing dust collection efficiency. In a case where filtering medium 100A is subject to pleating, a fiber layer (base material) which is excellent in folding processability and has a function of an aggregate is preferably included therein. A fiber layer serving as a base material does not necessarily have an excellent dust collection function.

Figure 4:
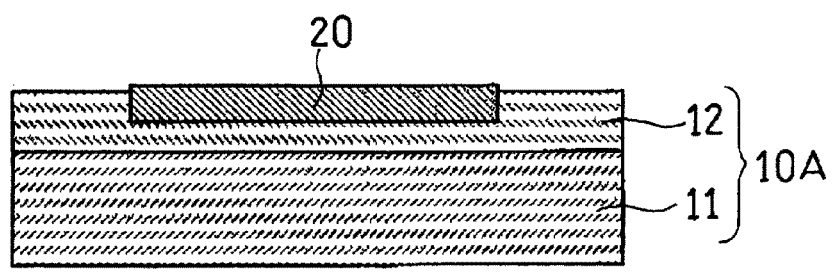
FIG. 4 is a sectional view of a modification example of the filtering medium illustrated in FIG. 3.

As illustrated in FIG. 4, in a case where laminated nonwoven fabric 10A has first fiber layer 11 and second fiber layer 12 denser than first fiber layer 11, first fiber layer 11 may function as a base material, and second fiber layer 12 may have a dust collection function. In this case, first fiber layer 11 may have a coarsely-woven structure. Second fiber layer 12 may be formed of fibers (hereinafter, referred to as second fibers) having a fiber diameter smaller than that of fibers (hereinafter, referred to as first fibers) forming first fiber layer 11, so as to achieve a high dust collection effect. First fiber layer 11 and second fiber layer 12 may be adhered to each other by using an adhesive.

Figure 5:
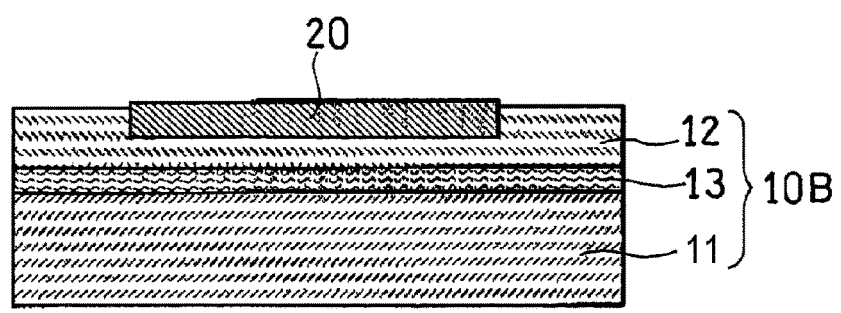
FIG. 5 is a sectional view of another modification example of the filtering medium illustrated in FIG. 3.

When taking into consideration a balance between pressure loss and dust collection efficiency, as illustrated in FIG. 5, it is preferable to use laminated nonwoven fabric 10B including first fiber layer 11, second fiber layer 12 denser than first fiber layer 11, and third fiber layer 13 containing fibers (hereinafter, referred to as third fibers) having a fiber diameter smaller than that of the second fibers. Third fiber layer 13 has a dust collection function of capturing minute dust. The third fibers are preferably nanofibers.

The third fibers have a small fiber diameter and thus tend to have low strength. Therefore, third fiber layer 13 is preferably sandwiched between first fiber layer 11 and second fiber layer 12. In this case, second fiber layer 12 has a function of protecting third fiber layer 13 and also capturing relatively large dust.

First fiber layer 11 or third fiber layer 13 and second fiber layer 12 may be adhered to each other by using an adhesive. On the other hand, third fiber layer 13 is preferably directly adhered to first fiber layer 11. For example, in a case where the third fibers are nanofibers generated through electrostatic spinning, nanofibers containing a solvent right after being generated through electrostatic spinning may be accumulated on the surface of first fiber layer 11. The nanofibers containing the solvent can be adhered to the first fibers without using an adhesive. Thereafter, the solvent remaining in the nanofibers may be removed through drying. However, in a case where adhesive strength is insufficient, an adhesive may be used between first fiber layer 11 and third fiber layer 13. In this case, first fiber layer 11 and/or third fiber layer 13 and second fiber layer 12 can be adhered to each other by using the adhesive sandwiched between first fiber layer 11 and third fiber layer 13.

Next, a preferred embodiment of laminated nonwoven fabric 10B including first fiber layer 11, second fiber layer 12, and third fiber layer 13 will be described in detail. First fiber layer 11 according to the present embodiment functions as a base material holding a shape of laminated nonwoven fabric 10B. In a case where the laminated nonwoven fabric is subject to pleating, first fiber layer 11 functions as a base material so as to hold a shape of a pleat.

First fiber layer 11 contains the first fibers. Materials of the first fibers are not particularly limited, and may include, for example, glass fibers, cellulose, acrylic resin, polyolefin (for example, polypropylene (PP) and polyethylene (PE)), polyester (for example, polyethylene terephthalate (PET) and polybutylene terephthalate), polyamide (PA), or mixtures thereof. Above all, as materials of the first fibers, PET or cellulose is preferably used from the viewpoint of holding the shape. Average fiber diameter D1 of the first fibers is not particularly limited, and is, for example, 1 μm to 40 μm, and is preferably 5 μm to 20 μm.

Average fiber diameter D1 is an average value of diameters of the first fibers. The diameter of the first fiber is a diameter of a section perpendicular to in a length direction of the first fiber. In a case where such a section is not circular, a maximum diameter may be considered as the diameter. A width in a direction perpendicular to the length direction of the first fiber when viewed from the normal direction of one principal surface of the first fiber layer may be regarded as the diameter of the first fiber. Average fiber diameter D1 is an average value of diameters of, for example, any ten first fibers contained in the first fiber layer at any locations. This is also the same for average fiber diameters D2 and D3 which will be described later.

First fiber layer 11 is manufactured by using, for example, a spun bonding method, a dry method (for example, an air-laid method), a wet method, a melt blow method, a needle punch method, or the like, and a manufacturing method thereof is not particularly limited. Above all, first fiber layer 11 is preferably manufactured by using the wet method in that it is easy to form a nonwoven fabric appropriate for a base material.

A pressure loss of first fiber layer 11 is also not particularly limited. Above all, in a case of performing measurement with a measuring machine in conformity with the regulations of JIS B9908, Form 1, an initial pressure loss of first fiber layer 11 is preferably about 0.1 Pa to 50 Pa, and is more preferably 0.5 Pa to 20 Pa. As long as the initial pressure loss of first fiber layer 11 falls within this range, a pressure loss of the whole of the laminated nonwoven fabric is suppressed. In the test method in the above mentioned Form 1, a pressure loss is measured as follows. A filter unit having a laminated nonwoven fabric is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via the tubes, respectively, and thus the pressure loss is obtained.

Thickness T1 of first fiber layer 11 is preferably 50 μm to 500 μm, and is more preferably 150 μm to 400 μm, from the viewpoint of pressure loss. Thickness T of the fiber layer is, for example, an average value of thicknesses of any ten locations in the fiber layer (the same applies hereinafter). The thickness is a distance between two principal surfaces of the fiber layer. Specifically, an image of a section of the fiber layer is captured, and, when a line perpendicular to one surface is drawn from any one point on one principal surface of the fiber layer to the other principal surface, among fibers on the line, a distance between outsides of two fibers which are most distant from each other is obtained as thickness T of the fiber layer. This is similarly performed on a plurality of any other points (for example, nine points) so that thicknesses of the fiber layer are calculated, and a numerical value obtained by averaging the thicknesses is used as thickness T of the fiber layer. When thickness T is calculated, an image having undergone a binarization process may be used.

Mass per unit area of first fiber layer 11 is preferably 10 $g/m^2$ to 200 $g/m^2$, and is more preferably 15 $g/m^2$ to 100 $g/m^2$, from the viewpoint of pressure loss.

Next, second fiber layer 12 has a function of collecting relatively large dust and also has a function of protecting third fiber layer 13 from various external loads.

Second fiber layer 12 contains the second fibers. Materials of the second fibers are not particularly limited, and may exemplify the same materials as those of the first fibers. Above all, polyolefin (particularly, PP) is preferably used in that the material is influenced by charging of the first electrode so as to be easily charged. Average fiber diameter D2 of the second fibers is not particularly limited. Average fiber diameter D2 is, for example, 0.5 μm to 20 μm, and is preferably 5 μm to 20 μm.

Second fiber layer 12 may be manufactured according to various methods in the same manner as first fiber layer 11, and a manufacturing method thereof is not particularly limited. Above all, second fiber layer 12 is preferably manufactured by using the melt blow method from the viewpoint that it is easy to form a fiber having a small fiber diameter appropriate for a filtering medium.

Second fiber layer 12 is denser than first fiber layer 11, and thus a pressure loss of second fiber layer 12 may be larger than a pressure loss of first fiber layer 11. In a case where measurement is performed in the same condition as described above, an initial pressure loss of second fiber layer 12 is preferably about 0.1 Pa to 50 Pa, and is more preferably 0.5 Pa to 20 Pa. As long as the initial pressure loss of second fiber layer 12 falls within this range, a pressure loss of the whole of the laminated nonwoven fabric is also suppressed.

Mass per unit area of second fiber layer 12 is preferably 10 $g/m^2$ to 200 $g/m^2$, and is more preferably 15 $g/m^2$ to 100 $g/m^2$. As long as the mass of second fiber layer 12 falls within this range, a pressure loss is suppressed and high dust collection efficiency also tends to be achieved.

Thickness T2 of second fiber layer 12 is preferably 50 μm to 500 μm, and is more preferably 150 μm to 400 μm, from the viewpoint of pressure loss.

Next, third fiber layer 13 contains the third fibers having average fiber diameter D3 smaller than average fiber diameter D1 of the first fibers and average fiber diameter D2 of the second fibers, and has a function of capturing minute dust. Average fiber diameter D3 is preferably equal to or less than 1/10 of average fiber diameter D2 (D3≤D2/10), and is more preferably D3≤D2/100. Average fiber diameter D3 is preferably 1/1000 or more of average fiber diameter D2. As long as average fiber diameter D3 falls within this range, a pressure loss is reduced and dust collection efficiency also tends to increase. Specifically, the third fibers are preferably nanofibers having average fiber diameter D3 of less than 1 μm, and average fiber diameter D3 is more preferably equal to or less than 300 nm. Average fiber diameter D3 is preferably equal to or more than 30 nm, and is more preferably equal to or more than 50 nm.

Mass per unit area of third fiber layer 13 is preferably 0.01 $g/m^2$ to 10 $g/m^2$, more preferably 0.01 $g/m^2$ to 5 $g/m^2$, and most preferably 0.01 $g/m^2$ to 1.5 $g/m^2$, or 0.03 $g/m^2$ to 3 $g/m^2$. As long as the mass of third fiber layer 13 falls within this range, a pressure loss is suppressed and high dust collection efficiency also tends to be achieved.

Materials of the third fibers are not particularly limited, and may include, for example, polymers such as PA, PI, PAL polyetherimide (PEI), polyacetal (POM), polycarbonate (PC), polyether ether ketone (PEEK), polysulfone (PSF), PES, polyphenylene sulfide (PPS), polytetrafluoroethylene (PTFE), polyarylate (PAR), polyacrylonitrile (PAN), PVDF, polyvinyl alcohol (PVA), polyvinyl acetate (PVAc), PP, PET, and PU. These materials may be used alone or in combination of two or more kinds thereof. Above all, in a case where the third fibers are formed by using an electrostatic spinning method, PES is preferably used. PVDF is preferably used in that average fiber diameter D3 is easily reduced.

Thickness T3 of third fiber layer 13 is preferably equal to or less than 10 and is more preferably 0.5 μm to 5 μm, from the viewpoint of pressure loss. In a case where measurement is performed in the same condition as described above, an initial pressure loss of third fiber layer 13 is preferably about 5 Pa to 40 Pa.

At least some of the third fibers may be put into gaps among the first fibers forming first fiber layer 11. In this case, third fiber layer 13 includes a composite layer formed of the first fibers and the third fibers. In this case, thickness T3 indicates the thickness of third fiber layer 13 including the composite layer.

A structure of the laminated nonwoven fabric is not limited to the above-described structure, and the laminated nonwoven fabric may have, for example, a two-layered structure in which first fiber layer 11 and third fiber layer 13 are provided without second fiber layer 12.

Next, first electrode 20 will be described in detail. First electrode 20 may be formed, for example, by printing an ink containing conductive particles on the surface of nonwoven fabric 10. In this case, if a size of the void of nonwoven fabric 10 and a size of the conductive particle are appropriately selected, at least a part of first electrode 20 can be caused to penetrate into the voids of nonwoven fabric 10 from the surface of nonwoven fabric 10.

As the conductive particles, metal particles, conductive carbon particles, or the like may be used. Metals forming the conductive particles may be silver, copper, gold, platinum, palladium, nickel, iron, cobalt, aluminum, tin, zinc, and the like. These metals may be used alone or in combination of plural kinds thereof. As the metal particle, an alloy particle may be used. As the carbon particle, a carbon black may be used. The carbon black may be an acetylene black, a Ketjen black, a furnace black, or a thermal black.

Among the conductive particles, the metal particles (hereinafter, referred to as metal nanoparticles) having an average particle diameter of less than 1 μm are preferably used in that the metal particles easily penetrate into gaps of nonwoven fabric 10, and the first electrode hardly deteriorates. Among the metal nanoparticle, if copper nanoparticles are used, manufacturing cost of the first electrode can be reduced, and the first electrode with favorable conductivity can be provided. If silver nanoparticles are used, manufacturing cost increases, but the first electrode with high conductivity can be provided. An amount of the metal nanoparticles contained in the ink may be, for example, 10% by mass to 60% by mass, inclusive.

An average particle diameter (a median diameter in a volume-basis particle size distribution) of the metal nanoparticles is preferably 1 nm to 200 nm, and is more preferably 1 nm to 50 nm. The particle size distribution may be measured by a dynamic light scattering type or laser diffraction type particle size distribution measurer.

The ink may contain a dispersant, a binder, an adhesion promoter, a surface tension adjuster, an antifoaming agent, a leveling agent, a rheology modifier, an ion strength adjuster, and the like in addition to the conductive particles. The dispersant has a function of suppressing aggregation of the particles by stabilizing the conductive particles. The binder contributes to holding of the shape of the applied film of the ink and/or adhesion between the conductive particles and the nonwoven fabric. An organic polymer material may be used for the binder.

If the dispersant is removed from surfaces of the metal nanoparticles, the metal nanoparticles aggregate together and are combined with each other, so as to form a bulk metal. As a result, the first electrode with favorable conductivity is formed.

As the dispersant, for example, organic compounds having polar functional groups which can coordinate to a metal atom, and various ionic polymers or various non-ionic polymers may be used. The ionic polymers or the non-ionic polymers include polyamine, polyethylene imine, polyvinyl pyrrolidone, polyethylene glycol, isostearyl ethyl imidazolinium ethosulfate, oleyl ethyl imidazolinium ethosulfate, phosphate-modified phosphate polyester copolymers, sulfonated styrene maleic anhydride ester, and the like.

An amount of the dispersant contained in the ink is preferably, for example, 1 part by mass to 30 parts by mass with respect to 100 parts by mass of the conductive particles. As long as the amount of the dispersant falls within this range, aggregation of the conductive particles can be suppressed, and resistance of the first electrode can also be reduced.

An amount of the binder contained in the ink is preferably, for example, 5 parts by mass to 50 parts by mass with respect to 100 parts by mass of the conductive particles. As long as the amount of the binder falls within this range, appropriate adhesive strength between the first electrode and the nonwoven fabric can be secured, and resistance of the first electrode can also be reduced.

Water may be used as a liquid component for dispersing or dissolving a solid content of the ink, but an organic solvent is preferably used. Examples of the organic solvent may include alcohols, ethers, esters, ketones, and hydrocarbons. More specifically, for example, methanol, ethanol, tetrahydrofuran, ethyl acetate, acetone, ethyl methyl ketone, cyclohexane, benzene, toluene, dodecane, and tetradecane may be used.

A method of applying the ink is not particularly limited, and the ink may be applied on the surface of the nonwoven fabric by using a method such as screen printing or ink jet printing. In a case where metal nanoparticles are used as the conductive particles, the metal nanoparticles applied on the nonwoven fabric may be irradiated with light so as to be sintered. In this case, a dispersant which separates from surfaces of the metal nanoparticles due to light irradiation may be used. If the dispersant separates, a state occurs in which the metal nanoparticles come into direct contact with each other, and thus a sintering process is automatically performed. A plurality of metal nanoparticles are combined with each other, and thus a conductive bulk metal is formed.

From the viewpoint of charging the entire filtering medium 100A as uniformly as possible, first electrode 20 preferably covers a region of the surface of nonwoven fabric 10 as much as possible. On the other hand, it is also important to leave the sufficient surface of nonwoven fabric 10 not covered with first electrode 20 so that first electrode 20 does not greatly hinder dust collection. When taking into consideration the above fact, a shape of first electrode 20 is not particularly limited, but is preferably a comb shape in addition to a spiral shape as illustrated in FIG. 1. A ratio of an area covered with first electrode 20 in the surface of nonwoven fabric 10 on which first electrode 20 is formed is preferably 0.1% to 10% in a plan view.

Penetration distance D of first electrode 20 from the surface of nonwoven fabric 10 is preferably equal to or more than 10 μm from the viewpoint of reducing material cost of first electrode 20 and securing a thickness which is unlikely to cause disconnection, and is preferably equal to or less than 80 μm from the viewpoint of suppressing an increase in the manufacturing cost. Penetration distance D is preferably restricted to 5% to 30% of the thickness of the nonwoven fabric. Here, penetration distance D is a thickness of a composite region of the conductive material and the fibers forming nonwoven fabric 10. Penetration distance D is obtained as a distance from the surface of nonwoven fabric 10 provided with first electrode 20 to a boundary between the composite region and the region formed of only the fibers (specifically, an average line of rough curves of the boundary between the composite region and the region formed of only the fibers).

Next, second electrode 40 will be described in detail. Second electrode 40 does not charge nonwoven fabric 10 and may thus have a small contact area with nonwoven fabric 10. Second electrode 40 may be provided in the same layer as first electrode 20, and may oppose first electrode 20 via the fiber layer. Second electrode 40 may be caused to penetrate into nonwoven fabric 10 so as to be deposited on nonwoven fabric 10. However, if a distance between first electrode 20 and second electrode 40 is too long, an effect achieved by providing second electrode 40 is reduced. From the above description, second electrode 40 is preferably provided on a peripheral edge or a frame of nonwoven fabric 10 if at all possible, so as not to hinder filtering medium 100A from collecting dust.

Second electrode 40 may be formed by using an ink containing conductive particles in the same manner as first electrode 20, but may be formed by using, for example, a cheaper metal foil and metal line. As metals forming second electrode 40, the same materials as those of first electrode 20 may be used.

Embodiment 2

Hereinafter, a filtering medium according to Embodiment 2 of the present disclosure will be described.

A filtering medium according to the present embodiment includes a nonwoven fabric, and a first electrode provided inside the nonwoven fabric, the first electrode having an input terminal of power. Power is input from the input terminal of the first electrode, and thus the nonwoven fabric can be charged along with the first electrode. Therefore, even in a case where the nonwoven fabric does not contain electret fibers, fibers forming the nonwoven fabric can capture dust by using an electrostatic force. The nonwoven fabric forming the filtering medium may or may not contain electret fibers.

Here, the nonwoven fabric is a laminated nonwoven fabric having a plurality of fiber layers. The first electrode is provided between the layers of the laminated nonwoven fabric. Consequently, the first electrode can be protected.

Since power is continuously input to the first electrode via the input terminal, dust itself is charged even after the fibers are covered with the dust. Therefore, it is possible to maintain a dust collection effect using the electrostatic force for a long period of time. A position of the input terminal is not particularly limited. If the first electrode has an exposure exposed to the laminated nonwoven fabric, the input terminal may be provided at any location of the exposure. A lead connected to the first electrode may be extracted from a side surface of the laminated nonwoven fabric, and the lead may be used as the input terminal.

From the viewpoint of reducing manufacturing cost, preferably, a non-overlapping portion is formed in a plurality of fiber layers without using a lead, and the first electrode is exposed to the non-overlapping portion. For example, a fiber layer (hereinafter, referred to as a coat layer) smaller than a fiber layer (hereinafter, referred to as a base layer) serving as a base and bonded to the first electrode is provided, and the coat layer is bonded to a surface of the base layer on a side on which the first electrode is formed, via the first electrode. In this case, a shape of the coat layer having a small size may be designed so that a part of the first electrode is exposed. Instead of changing a size of the coat layer, a window or a notch may be provided so that a part of the first electrode is exposed. The base layer and/or the coat layer may be a laminate of two or more fiber layers.

In order to charge the first electrode, an open end may be provided in the first electrode so that a current does not substantially flow through the first electrode. In this case, typically, the first electrode forms an open circuit, and thus a current does not substantially flow through the first electrode even if power is input via the input terminal.

An output terminal may be provided in the first electrode, and a high resistor may also be connected to the output terminal. For example, if a voltage of the input terminal is 100 V, a high resistor with a resistance value of 1 MΩ or more may be used. Consequently, a current value can be set to be 0.5 mA or less which is regarded as not being sensed by a person. However, if a weak current continuously flows through the high resistor, heat may be generated therefrom. Therefore, the high resistor is preferably provided outside the filtering medium.

The first electrode may be formed only by disposing a conductive material between the layers of the laminated nonwoven fabric. As the first electrode, a cheap metal foil may be used. For example, in a manufacturing process of the laminated nonwoven fabric, the first electrode may be formed by attaching a metal foil to a surface of any fiber layer by using an adhesive. However, from the viewpoint of increasing the bonding strength between the laminated nonwoven fabric and the first electrode, the first electrode is preferably formed by using conductive particles. For example, an ink (or a paste) containing conductive particles may be applied on a surface of any fiber layer and may then be dried so as to form the first electrode. A method of applying the ink on the fiber layer is not particularly limited, and, for example, the ink may be printed on the surface of the fiber layer.

At least a part of the first electrode preferably penetrates into voids of at least one selected from a plurality of fiber layers. Consequently, the first electrode is reliably fixed to the laminated nonwoven fabric and is thus hardly peeled off. Therefore, the filtering medium may be folded or bent, and thus the filtering medium is easily subject to pleating. In a case where the first electrode is formed by using conductive particles, it becomes easier to cause at least a part of the first electrode to penetrate into voids of a base fiber layer in which the first electrode is formed.

The filtering medium according to the present embodiment may further include a second electrode. In this case, the first electrode and the second electrode are insulated from each other by sandwiching at least one selected from a plurality of fiber layers between the first electrode and the second electrode, or a high resistor is connected between the first electrode and the second electrode, and thus the second electrode has a potential which is different from a potential of the first electrode. The second electrode is provided, and thus the safety when treating the filtering medium and an apparatus (an air purifier or the like) having the filtering medium built thereinto is improved. The second electrode may be grounded. Consequently, the safety is further improved. In a case where the second electrode is grounded, the second electrode may be connected to a ground line of an apparatus to which the filtering medium is attached.

For example, in a case where the first electrode has negative electric charge, and the second electrode has positive electric charge, dust receiving the negative electric charge in the first electrode may be captured at or around the second electrode. Therefore, a dust collection effect is improved.

The filtering medium may further include a fixing tool (for example, a frame for fixing the periphery of the laminated nonwoven fabric) for fixing the laminated nonwoven fabric. The fixing tool or the frame is provided, and thus the filtering medium is easily attached to an apparatus such as an air purifier.

The laminated nonwoven fabric preferably has at least a first fiber layer and a second fiber layer denser than the first fiber layer. Consequently, the first fiber layer can be made to mainly function as a base material holding the mechanical strength of the filtering medium. On the other hand, the dense second fiber layer may mainly have a dust collection function of capturing dust. In this case, the first electrode may be sandwiched between the first fiber layer and the second fiber layer.

The second electrode may be provided between layers different from the layers having the first electrode, and may be provided an outer surface of the laminated nonwoven fabric. The second electrode may be provided along the periphery of the first electrode. In this case, the second electrode may be fixed to a frame. The outer surface is not a surface corresponding to a boundary with another fiber layer but is an open surface.

The first electrode is more easily joined to the dense second fiber layer than the first fiber layer. Therefore, in a case where the laminated nonwoven fabric is used, the first electrode is preferably provided on a surface (inner surface) of the second fiber layer on the first fiber layer side. This is so that the first electrode is hardly peeled off out of the fiber layer, or the first electrode is hardly disconnected. In a case where an ink containing conductive particles is applied on the surface of the second fiber layer, it is easy to control the extent of penetration of the ink into the second fiber layer.

The laminated nonwoven fabric may further have a third fiber layer containing fibers having a fiber diameter smaller than that of the fibers forming the second fiber layer. The third fiber layer may have a function of capturing minute dust. Consequently, it is easy to keep a balance between pressure loss and dust collection efficiency. The third fiber layer is preferably formed of, for example, nanofibers having a fiber diameter of less than 1 µm. In this case, the strength of the third fiber layer is low, but the third fiber layer is sandwiched between the first fiber layer and the second fiber layer, and thus the third fiber layer can be protected. In this case, the first electrode is preferably sandwiched between the third fiber layer and the second fiber layer. Consequently, the first electrode is hardly peeled off out of the fiber layer, or the first electrode is further hardly disconnected. Note that the expression that a nonwoven contains fibers means that the nonwoven contains the fibers as a major component as described in Embodiment 1, and the content of the main components is 80 weight % or greater. For example, the third fiber layer may contain fibers having a fiber diameter smaller than that of the fibers forming the second fiber layer, as main components.

Materials of the fibers forming the first fiber layer and/or the second fiber layer preferably include polyolefin, polyester, polyamide (PA), cellulose, and the like. These materials may be used alone or in combination of a plurality of kinds thereof. This is because these materials are easily charged and can increase a dust collection effect using an electrostatic force. Materials of the fibers forming the third fiber layer preferably include polyethersulfone (PES), polyvinylidene fluoride (PVDF), polyimide (PI), polyamideimide (PAD, polyurethane (PU), and the like. These materials may be used alone or in combination of a plurality of kinds thereof.

The filtering medium according to the present embodiment may be used in an air purifier including a sucker of a gas, a discharger of the gas, and a filtering medium disposed between the sucker and the discharger. The air purifier has an output terminal from which power is output to the input terminal of the first electrode. A voltage is applied to the input terminal of the first electrode via the output terminal so that the first electrode is charged, and thus the nonwoven fabric is charged. The power input via the input terminal is preferably DC power so that a reverse potential does not occur. In a case where the filtering medium has a second electrode, the air purifier is preferably further provided with a ground line for connecting the second electrode.

Hereinafter, the present embodiment will be described with reference to the drawings. However, the present disclosure is not limited to the following embodiment.

Figure 6:
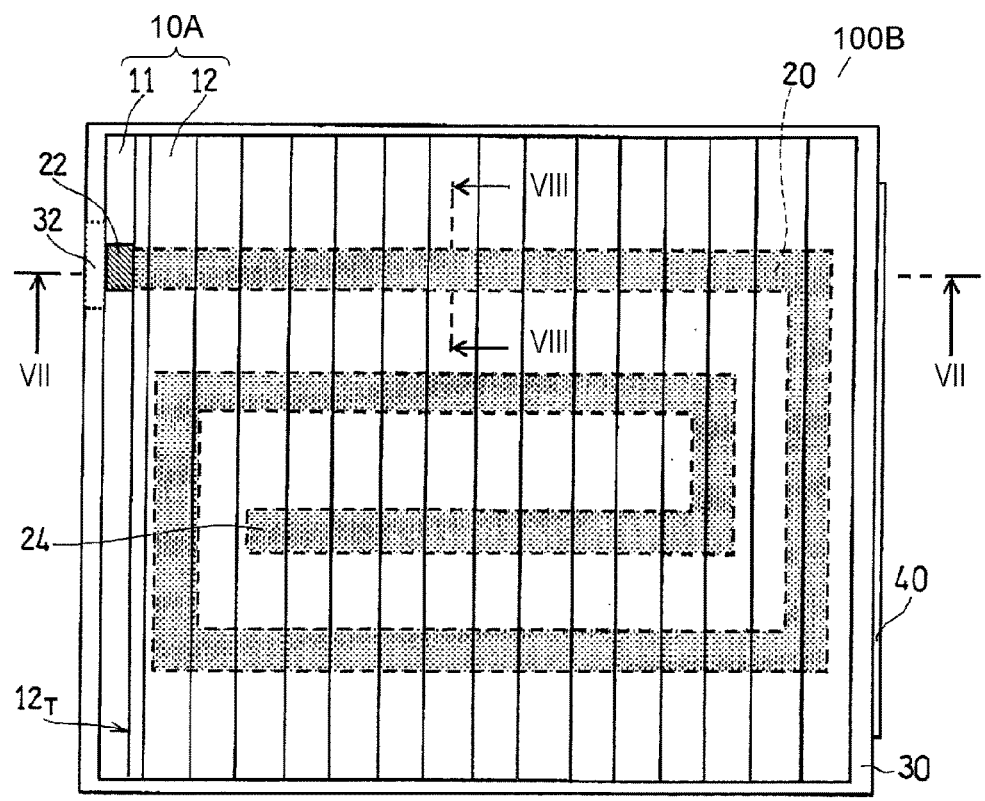
FIG. 6 is a plan view conceptually illustrating a structure of a filtering medium according to Embodiment 2 of the present disclosure.
Figure 7:
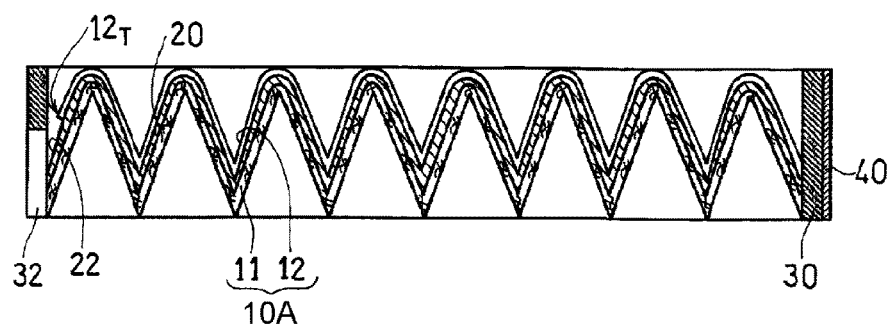
FIG. 7 is a sectional view taken along line VII-VII in the filtering medium illustrated in FIG. 6.

FIG. 6 is a plan view conceptually illustrating a structure of a filtering medium according to Embodiment 2 of the present disclosure; FIG. 7 is a sectional view taken along line VII-VII in FIG. 6; and FIG. 8 is a sectional view taken along line VIII-VIII in FIG. 6.

Filtering medium 100B includes laminated nonwoven fabric 10A, and first electrode 20 provided between fiber layers forming laminated nonwoven fabric 10A. As illustrated in FIG. 6, first electrode 20 has input terminal 22 of power and open end 24. Laminated nonwoven fabric 10A includes first fiber layer 11 bonded to first electrode 20, and second fiber layer 12 covering a surface of first fiber layer 11 on a side on which first electrode 20 is formed, a size of second fiber layer 12 being smaller than a size of first fiber layer 11. Here, a part of first fiber layer 11 overhangs from one end 12T of second fiber layer 12, and a part of first electrode 20 is exposed to the overhanging non-overlapping portion. At least a part of the exposure of first electrode 20 is used as input terminal 22.

As illustrated in FIG. 7, laminated nonwoven fabric 10A is folded along with first electrode 20 formed between the layers thereof and is pleated.

Figure 8:
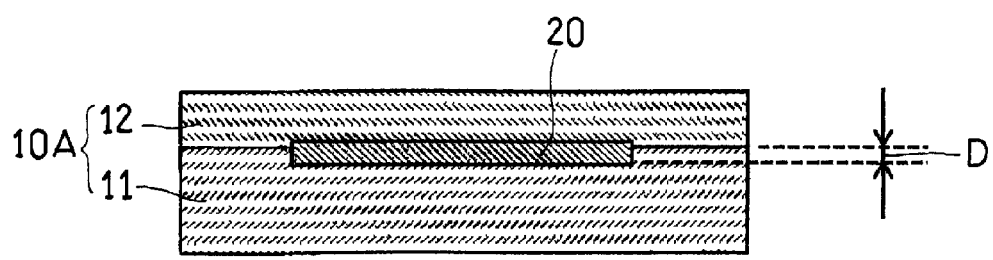
FIG. 8 is a sectional view taken along line in the filtering medium illustrated in FIG. 6.

As illustrated in FIG. 8, a part of first electrode 20 penetrates into voids between fibers forming first fiber layer 11 from the surface of first fiber layer 11 provided with first electrode 20. In other words, a part of the conductive material forming first electrode 20 is combined with the fibers forming first fiber layer 11. Therefore, laminated nonwoven fabric 10A is easily influenced by a potential of first electrode 20, and, if first electrode 20 is charged, laminated nonwoven fabric 10A is also charged.

Filtering medium 100B is fixed to frame 30 surrounding the periphery of laminated nonwoven fabric 10A. Frame 30 is preferably made of a nonconductive material, and is made of, for example, plastic such as polypropylene or polyethylene, or paper. In a case where frame 30 is made of metal, frame 30 may be regarded as second electrode 40 to be described later.

Filtering medium 100B includes second electrode 40, and second electrode 40 is fixed to one side of frame 30. Therefore, laminated nonwoven fabric 10A is not covered with second electrode 40, and thus second electrode 40 does not hinder dust collection. Second electrode 40 is completely insulated from first electrode 20 via laminated nonwoven fabric 10A and frame 30.

Opening 32 into which an output terminal (not illustrated) of a power source line of an apparatus such as an air purifier is inserted is provided on another side of frame 30 so as to correspond to input terminal 22 of first electrode 20. If frame 30 is attached to the apparatus, the output terminal of the apparatus is in contact with input terminal 22 of first electrode 20. In this case, second electrode 40 is in contact with a ground line provided in the apparatus.

Next, laminated nonwoven fabric 10A will be described in detail. As illustrated in FIG. 8, laminated nonwoven fabric 10A includes a plurality of fiber layers. Meanwhile, laminated nonwoven fabric 10B illustrated in FIG. 9 may be used instead of laminated nonwoven fabric 10A. Laminated nonwoven fabric 10B also includes a plurality of fiber layers. Regardless of the illustrated example, a laminated nonwoven fabric including three or more fiber layers may be used. A laminated nonwoven fabric is preferably used instead of a single-layered nonwoven fabric from the viewpoint of reducing pressure loss as much as possible and increasing dust collection efficiency. In a case where filtering medium 100B is subject to pleating, a fiber layer (base material) which is excellent in folding processability and has a function of an aggregate is preferably included therein. A fiber layer serving as a base material does not necessarily have an excellent dust collection function.

As illustrated in FIG. 8, in a case where laminated nonwoven fabric 10A has first fiber layer 11 and second fiber layer 12, first fiber layer 11 may function as a base material, and second fiber layer 12 may be formed to be denser than first fiber layer 11 so as to have a dust collection function. In this case, first fiber layer 11 may have a coarsely-woven structure. Second fiber layer 12 may be formed of fibers (hereinafter, referred to as second fibers) having a fiber diameter smaller than that of fibers (hereinafter, referred to as first fibers) forming first fiber layer 11, so as to achieve a high dust collection effect. First fiber layer 11 and second fiber layer 12 may be adhered to each other by using an adhesive. In a case of FIG. 8, first fiber layer 11 corresponds to a base layer, and second fiber layer 12 corresponds to a coat layer.

Figure 9:
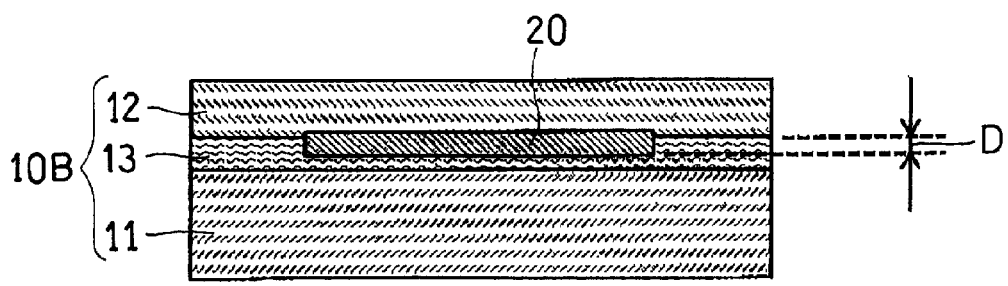
FIG. 9 is a sectional view of a modification example of the filtering medium illustrated in FIG. 8.

When taking into consideration a balance between pressure loss and dust collection efficiency, as illustrated in FIG. 9, it is preferable to use laminated nonwoven fabric 10B including first fiber layer 11, second fiber layer 12 denser than first fiber layer 11, and third fiber layer 13 containing fibers (hereinafter, referred to as third fibers) having a fiber diameter smaller than that of the second fibers. Third fiber layer 13 has a dust collection function of capturing minute dust. The third fibers are preferably nanofibers. In a case of FIG. 9, first fiber layer 11 or a laminate of the first fiber layer and the third fiber layer corresponds to a base layer, and second fiber layer 12 corresponds to a coat layer.

The third fibers have a small fiber diameter and thus tend to have low strength. Therefore, third fiber layer 13 is preferably sandwiched between first fiber layer 11 and second fiber layer 12. In this case, second fiber layer 12 has a function of protecting third fiber layer 13 and also capturing relatively large dust.

First fiber layer 11 or third fiber layer 13 and second fiber layer 12 may be adhered to each other by using an adhesive. On the other hand, third fiber layer 13 is preferably directly adhered to first fiber layer 11. For example, in a case where the third fibers are nanofibers generated through electrostatic spinning, nanofibers containing a solvent right after being generated through electrostatic spinning may be accumulated on the surface of first fiber layer 11. The nanofibers containing the solvent can be adhered to the first fibers without using an adhesive. Thereafter, the solvent remaining in the nanofibers may be removed through drying. However, in a case where adhesive strength is insufficient, an adhesive may be used between first fiber layer 11 and third fiber layer 13. In this case, first fiber layer 11 and/or third fiber layer 13 and second fiber layer 12 can be adhered to each other by using the adhesive sandwiched between first fiber layer 11 and third fiber layer 13.

Next, a preferred embodiment of laminated nonwoven fabric 10B including first fiber layer 11, second fiber layer 12, and third fiber layer 13 will be described in detail. First fiber layer 11 according to the present embodiment functions as a base material holding a shape of laminated nonwoven fabric 10B. In a case where the laminated nonwoven fabric is subject to pleating, first fiber layer 11 functions as a base material so as to hold a shape of a pleat.

First fiber layer 11 contains the first fibers. Materials of the first fibers are not particularly limited, and may include, for example, glass fibers, cellulose, acrylic resin, polyolefin (for example, polypropylene (PP) and polyethylene (PE)), polyester (for example, polyethylene terephthalate (PET) and polybutylene terephthalate), polyamide (PA), or mixtures thereof. Above all, as materials of the first fibers, PET or cellulose is preferably used from the viewpoint of holding the shape. Average fiber diameter D1 of the first fibers is not particularly limited, and is, for example, 1 µm to 40 µm, and is preferably 5 µm to 20 µm.

Average fiber diameter D1 is an average value of diameters of the first fibers. The diameter of the first fiber is a diameter of a section perpendicular to in a length direction of the first fiber. In a case where such a section is not circular, a maximum diameter may be considered as the diameter. A width in a direction perpendicular to the length direction of the first fiber when viewed from the normal direction of one principal surface of the first fiber layer may be regarded as the diameter of the first fiber. Average fiber diameter D1 is an average value of diameters of, for example, any ten first fibers contained in the first fiber layer at any locations. This is also the same for average fiber diameters D2 and D3 which will be described later.

First fiber layer 11 is manufactured by using, for example, a spun bonding method, a dry method (for example, an air-laid method), a wet method, a melt blow method, a needle punch method, or the like, and a manufacturing method thereof is not particularly limited. Above all, first fiber layer 11 is preferably manufactured by using the wet method in that it is easy to form a nonwoven fabric appropriate for a base material.

A pressure loss of first fiber layer 11 is also not particularly limited. Above all, in a case of performing measurement with a measuring machine in conformity with the regulations of JIS B9908, Form 1, an initial pressure loss of first fiber layer 11 is preferably about 0.1 Pa to 50 Pa, and is more preferably 0.5 Pa to 20 Pa. As long as the initial pressure loss of first fiber layer 11 falls within this range, a pressure loss of the whole of the laminated nonwoven fabric is suppressed.

Thickness T1 of first fiber layer 11 is preferably 50 µm to 500 µm, and is more preferably 150 µm to 400 µm, from the viewpoint of pressure loss. Thickness T of the fiber layer is, for example, an average value of thicknesses of any ten locations in the fiber layer (the same applies hereinafter). The thickness is a distance between two principal surfaces of the fiber layer. Specifically, an image of a section of the fiber layer is captured, and, when a line perpendicular to one surface is drawn from any one point on one principal surface of the fiber layer to the other principal surface, among fibers on the line, a distance between outsides of two fibers which are most distant from each other is obtained as thickness T of the fiber layer. This is similarly performed on a plurality of any other points (for example, nine points) so that thicknesses of the fiber layer are calculated, and a numerical value obtained by averaging the thicknesses is used as thickness T of the fiber layer. When thickness T is calculated, an image having undergone a binarization process may be used.

Mass per unit area of first fiber layer 11 is preferably 10 g/m$^2$ to 200 g/m$^2$, and is more preferably 15 g/m$^2$ to 100 g/m$^2$, from the viewpoint of pressure loss.

Next, second fiber layer 12 has a function of collecting relatively large dust and also has a function of protecting third fiber layer 13 from various external loads.

Second fiber layer 12 contains the second fibers. Materials of the second fibers are not particularly limited, and may exemplify the same materials as those of the first fibers. Above all, polyolefin (particularly, PP) is preferably used in that the material is influenced by charging of the first electrode so as to be easily charged. Average fiber diameter D2 of the second fibers is not particularly limited. Average fiber diameter D2 is, for example, 0.5 µm to 20 µm, and is preferably 5 µm to 20 µm.

Second fiber layer 12 may be manufactured according to various method in the same manner as first fiber layer 11, and a manufacturing method thereof is not particularly limited. Above all, second fiber layer 12 is preferably manufactured by using the melt blow method from the viewpoint that it is easy to form a fiber having a small fiber diameter appropriate for a filtering medium.

Second fiber layer 12 is denser than first fiber layer 11, and thus a pressure loss of second fiber layer 12 may be larger than a pressure loss of first fiber layer 11. In a case where measurement is performed in the same condition as described above, an initial pressure loss of second fiber layer 12 is preferably about 0.1 Pa to 50 Pa, and is more preferably 0.5 Pa to 20 Pa. As long as the initial pressure loss of second fiber layer 12 falls within this range, a pressure loss of the whole of the laminated nonwoven fabric is suppressed.

Mass per unit area of second fiber layer 12 is preferably 10 g/m$^2$ to 200 g/m$^2$, and is more preferably 15 g/m$^2$ to 100 g/m$^2$. As long as the mass of second fiber layer 12 falls within this range, a pressure loss is reduced and high dust collection efficiency also tends to be achieved.

Thickness T2 of second fiber layer 12 is preferably 50 μm to 500 μm, and is more preferably 150 μm to 400 μm, from the viewpoint of pressure loss.

Next, third fiber layer 13 contains the third fibers having average fiber diameter D3 smaller than average fiber diameter D1 of the first fibers and average fiber diameter D2 of the second fibers, and has a function of capturing minute dust. Average fiber diameter D3 is preferably equal to or less than 1/10 of average fiber diameter D2 (D3≤D2/10), and is more preferably D3≤D2/100. Average fiber diameter D3 is preferably 1/1000 or more of average fiber diameter D2. As long as average fiber diameter D3 falls within this range, a pressure loss is suppressed and dust collection efficiency also tends to increase. Specifically, the third fibers are preferably nanofibers having average fiber diameter D3 of less than 1 μm, and average fiber diameter D3 is more preferably equal to or less than 300 nm. Average fiber diameter D3 is preferably equal to or more than 30 nm, and is more preferably equal to or more than 50 nm.

Mass per unit area of third fiber layer 13 is preferably 0.01 g/m$^2$ to 10 g/m$^2$, more preferably 0.01 g/m$^2$ to 5 g/m$^2$, and most preferably 0.01 g/m$^2$ to 1.5 g/m$^2$, or 0.03 g/m$^2$ to 3 g/m$^2$. As long as the mass of third fiber layer 13 falls within this range, a pressure loss is suppressed and high dust collection efficiency also tends to be achieved.

Materials of the third fibers are not particularly limited, and may include, for example, polymers such as PA, PI, PAI, polyetherimide (PEI), polyacetal (POM), polycarbonate (PC), polyether ether ketone (PEEK), polysulfone (PSF), PES, polyphenylene sulfide (PPS), polytetrafluoroethylene (PTFE), polyarylate (PAR), polyacrylonitrile (PAN), PVDF, polyvinyl alcohol (PVA), polyvinyl acetate (PVAc), PP, PET, and PU. These materials may be used alone or in combination of two or more kinds thereof. Above all, in a case where the third fibers are formed by using an electrostatic spinning method, PES is preferably used. PVDF is preferably used in that average fiber diameter D3 is easily reduced.

Thickness T3 of third fiber layer 13 is preferably equal to or less than 10 μm, and is more preferably 0.5 μm to 5 μm, from the viewpoint of pressure loss. In a case where measurement is performed in the same condition as described above, an initial pressure loss of third fiber layer 13 is preferably about 5 Pa to 40 Pa.

At least some of the third fibers may be put into gaps among the first fibers forming first fiber layer 11. In this case, third fiber layer 13 includes a composite layer formed of the first fibers and the third fibers. In this case, thickness T3 indicates the thickness of third fiber layer 13 including the composite layer.

A structure of the laminated nonwoven fabric is not limited to the above-described structure, and the laminated nonwoven fabric may have, for example, a two-layered structure in which first fiber layer 11 and third fiber layer 13 are provided without second fiber layer 12.

Next, first electrode 20 will be described in detail. First electrode 20 may be formed, for example, by printing an ink containing conductive particles on the surface of the fiber layer serving as a base layer among fiber layers forming laminated nonwoven fabric 10A. In this case, if a size of the void of the base layer and a size of the conductive particle are appropriately selected, at least a part of first electrode 20 can be caused to penetrate into the voids of the base layer from the surface of base layer.

As the conductive particles, metal particles, conductive carbon particles, or the like may be used. Metals forming the conductive particles may be silver, copper, gold, platinum, palladium, nickel, iron, cobalt, aluminum, tin, zinc, and the like. These metals may be used alone or in combination of plural kinds thereof. As the metal particle, an alloy particle may be used. As the carbon particle, a carbon black may be used. The carbon black may be an acetylene black, a Ketjen black, a furnace black, or a thermal black.

Among the conductive particles, the metal particles (hereinafter, referred to as metal nanoparticles) having an average particle diameter of less than 1 μm are preferably used in that the metal particles easily penetrate into gaps of laminated nonwoven fabric 10A, and the first electrode hardly deteriorates. Among the metal nanoparticle, if copper nanoparticles are used, manufacturing cost of the first electrode can be reduced, and the first electrode with favorable conductivity can be provided. If silver nanoparticles are used, manufacturing cost increases, but the first electrode with high conductivity can be provided. An amount of the metal nanoparticles contained in the ink may be, for example, 10% by mass to 60% by mass.

An average particle diameter (a median diameter in a volume-basis particle size distribution) of the metal nanoparticles is preferably 1 nm to 200 nm, and is more preferably 1 nm to 50 nm. The particle size distribution may be measured by a dynamic light scattering type or laser diffraction type particle size distribution measurer.

The ink may contain a dispersant, a binder, an adhesion promoter, a surface tension adjuster, an antifoaming agent, a leveling agent, a rheology modifier, an ion strength adjuster, and the like in addition to the conductive particles. The dispersant has a function of suppressing aggregation of the particles by stabilizing the conductive particles. The binder contributes to holding of the shape of the applied film of the ink and/or adhesion between the conductive particles and the nonwoven fabric. An organic polymer material may be used for the binder.

If the dispersant is removed from surfaces of the metal nanoparticles, the metal nanoparticles aggregate together and are combined with each other, so as to form a bulk metal. As a result, the first electrode with favorable conductivity is formed.

As the dispersant, for example, organic compounds having polar functional groups coordinatable to a metal atom, and various ionic polymers or various non-ionic polymers may be used. The ionic polymers or the non-ionic polymers include polyamine, polyethylene imine, polyvinyl pyrrolidone, polyethylene glycol, isostearyl ethyl imidazolinium ethosulfate, oleyl ethyl imidazolinium ethosulfate, phosphate-modified phosphate polyester copolymers, sulfonated styrene maleic anhydride ester, and the like.

An amount of the dispersant contained in the ink is preferably, for example, 1 part by mass to 30 parts by mass with respect to 100 parts by mass of the conductive particles. As long as the amount of the dispersant falls within this range, aggregation of the conductive particles can be suppressed, and resistance of the first electrode can also be reduced.

An amount of the binder contained in the ink is preferably, for example, 5 parts by mass to 50 parts by mass with respect to 100 parts by mass of the conductive particles. As long as the amount of the binder falls within this range, appropriate adhesive strength between the first electrode and the nonwoven fabric can be secured, and resistance of the first electrode can also be reduced.

Water may be used as a liquid component for dispersing or dissolving a solid content of the ink, but an organic solvent is preferably used. Examples of the organic solvent may include alcohols, ethers, esters, ketones, and hydrocarbons. More specifically, for example, methanol, ethanol, tetrahydrofuran, ethyl acetate, acetone, ethyl methyl ketone, cyclohexane, benzene, toluene, dodecane, and tetradecane may be used.

A method of applying the ink is not particularly limited, and the ink may be applied on the surface of the base layer by using a method such as screen printing or ink jet printing. In a case where metal nanoparticles are used as the conductive particles, the metal nanoparticles applied to the base layer may be irradiated with light so as to be sintered. In this case, a dispersant which separates from surfaces of the metal nanoparticles due to light irradiation may be used. If the dispersant separates, a state occurs in which the metal nanoparticles come into direct contact with each other, and thus a sintering process is automatically performed. A plurality of metal nanoparticles are combined with each other, and thus a conductive bulk metal is formed.

From the viewpoint of charging the entire filtering medium 100B as uniformly as possible, first electrode 20 covers a region of the surface of the base layer as much as possible. On the other hand, it is also important to leave the sufficient surface of the base layer not covered with first electrode 20 so that first electrode 20 does not greatly hinder dust collection. When taking into consideration the above fact, a shape of first electrode 20 is not particularly limited, but is preferably a comb shape in addition to a spiral shape as illustrated in FIG. 6. A ratio of an area covered with first electrode 20 in the surface of the base layer on which first electrode 20 is formed is preferably 0.1% to 10% in a plan view.

Penetration distance D of first electrode 20 from the surface of the base layer is preferably equal to or more than 10 µm from the viewpoint of reducing material cost of first electrode 20 and securing a sufficient thickness which is unlikely to cause disconnection, and is preferably equal to or less than 80 µm from the viewpoint of suppressing an increase in the manufacturing cost. Penetration distance D is preferably restricted to 5% to 30% of the thickness of the laminated nonwoven fabric. Here, penetration distance D is a thickness of a composite region of the conductive material and the fibers forming laminated nonwoven fabric 10A. Penetration distance D is obtained as a distance from the surface of the base layer provided with first electrode 20 to a boundary between the composite region and the region formed of only the fibers (specifically, an average line of rough curves of the boundary between the composite region and the region formed of only the fibers).

Next, second electrode 40 will be described in detail. Second electrode 40 does not charge laminated nonwoven fabric 10A and may thus have a small contact area with laminated nonwoven fabric 10A. Second electrode 40 may be provided in the same fiber layer as first electrode 20, and may oppose first electrode 20 via the fiber layer. Second electrode 40 may be caused to penetrate into laminated nonwoven fabric 10A so as to be deposited on the nonwoven fabric. However, if a distance between first electrode 20 and second electrode 40 is too long, an effect achieved by providing second electrode 40 is reduced. From the above description, second electrode 40 is preferably provided on a peripheral edge or a frame of laminated nonwoven fabric 10A if at all possible, so as not to hinder filtering medium 100B from collecting dust.

Second electrode 40 may be formed by using an ink containing conductive particles in the same manner as first electrode 20, but may be formed by using, for example, a cheaper metal foil and metal line. As metals forming second electrode 40, the same materials as those of first electrode 20 may be used.

Embodiment 3

Figure 10:
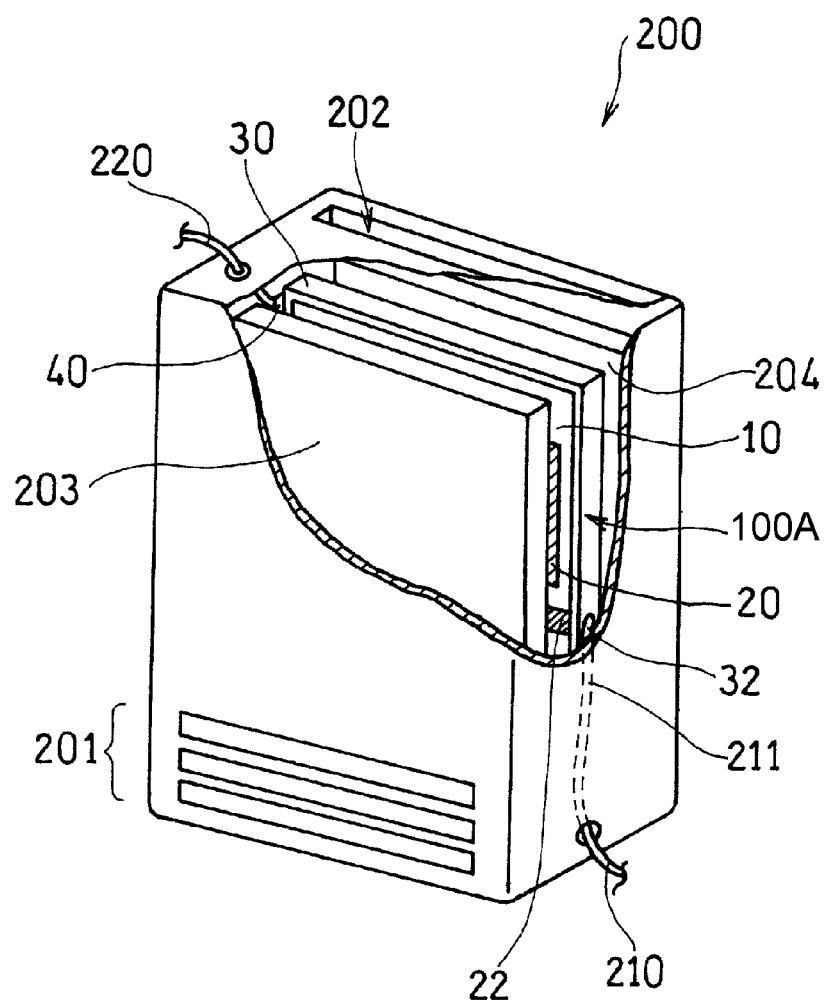
FIG. 10 is a partially cut perspective view schematically illustrating an air purifier according to Embodiment 3 of the present disclosure.

Next, air purifier 200 according to Embodiment 3 of the present disclosure will be described in detail. As illustrated in FIG. 10, air purifier 200 includes sucker 201 of a gas, discharger 202 of the gas, and filtering medium 100A disposed therebetween. Air purifier 200 takes the external air from sucker 201 into the inside of air purifier 200. The taken air passes through filtering medium 100A, and dust contained in the air is captured by the filtering medium. The cleaned air from which the dust is removed is discharged from discharger 202 to the outside.

Filtering medium 100A includes nonwoven fabric 10, first electrode 20 formed on the surface of nonwoven fabric 10, frame 30 fixing the periphery of nonwoven fabric 10, and second electrode 40 fixed to frame 30, as described in Embodiment 1. On the other hand, air purifier 200 includes power source line 210 connected to an external power source, and ground line 220 for releasing electricity to the outside. Power source line 210 has output terminal 211 for applying a voltage to input terminal 22 of first electrode 20. Output terminal 211 is disposed to be connected to input terminal 22 via opening 32 of frame 30 when filtering medium 100A is attached to air purifier 200. Ground line 220 is disposed to be in contact with second electrode 40 when filtering medium 100A is attached to air purifier 200.

If a voltage is always applied to first electrode 20 via output terminal 211, first electrode 20 and nonwoven fabric 10 are charged, and dust adsorbed by filtering medium 100A is also charged. Thus, air purifier 200 can continuously collect dust by using an electrostatic force for a long period of time. On the other hand, since second electrode 40 is connected to the ground line, frame 30 is not substantially charged, and thus it is possible to prevent static electricity from being collected in frame 30 and peripheral components thereof. Consequently, high safety is ensured.

As illustrated in FIG. 10, air purifier 200 may be further provided with pre-filter 203 capturing large dust between sucker 201 and filtering medium 100A, and may be further provided with deodorizing filter 204 between filtering medium 100A and discharger 202. Air purifier 200 may be further provided with a humidifying filter (not illustrated) or the like.

The same effect is achieved even if filtering medium 100B described in Embodiment 2 is used instead of filtering medium 100A.

As described above, the filtering medium according to the present disclosure is suitable for a filtering medium for dust collection of an air purifier or an air conditioner.

What is claimed is:

1. A filtering medium comprising:
   a nonwoven fabric; and
   a first electrode provided on a surface of the nonwoven fabric,
   wherein the first electrode has an input terminal of power,
   wherein the nonwoven fabric includes a first fiber layer and a second fiber layer denser than the first fiber layer, and
   wherein the nonwoven fabric further includes a third fiber layer that contains fibers having a fiber diameter smaller than a fiber diameter of fibers forming the second fiber layer, and is sandwiched between the first fiber layer and the second fiber layer.

2. The filtering medium according to claim 1, wherein the first electrode has an open end.

3. The filtering medium according to claim 1, wherein at least a part of the first electrode penetrates into voids of the nonwoven fabric from the surface of the nonwoven fabric.

4. The filtering medium according to claim 1, further comprising:
   a second electrode,
   wherein the nonwoven fabric is sandwiched between the first electrode and the second electrode, and thus the first electrode and the second electrode are insulated from each other.

5. The filtering medium according to claim 4, further comprising:
   a frame fixing a periphery of the nonwoven fabric,
   wherein the second electrode is fixed to the frame.

6. The filtering medium according to claim 1, wherein the first electrode is provided on an outer surface of the second fiber layer.

7. The filtering medium according to claim 1, wherein at least one of the first fiber layer and the second fiber layer contains fibers including at least one kind selected from the group consisting of polyolefin, polyester, polyamide, and cellulose.

8. A filtering medium comprising:
   a laminated nonwoven fabric including a plurality of fiber layers; and
   a first electrode provided between the plurality of fiber layers of the laminated nonwoven fabric,
   wherein the plurality of fiber layers include a first fiber layer, and a second fiber layer denser than the first fiber layer, and
   wherein the plurality of fiber layers further include a third fiber layer that contains fibers having a fiber diameter smaller than a fiber diameter of fibers forming the second fiber layer, and is sandwiched between the first fiber layer and the second fiber layer.

9. The filtering medium according to claim 8, wherein the first electrode has an exposure exposed from the laminated nonwoven fabric, and the input terminal is provided on the exposure.

10. The filtering medium according to claim 8, wherein the first electrode has an open end.

11. The filtering medium according to claim 8, further comprising:
    a second electrode,
    wherein at least one selected from the plurality of fiber layers is sandwiched between the first electrode and the second electrode, and thus the first electrode and the second electrode are insulated from each other.

12. The filtering medium according to claim 8, further comprising:
    a second electrode, and
    a frame fixing a periphery of the laminated nonwoven fabric,
    wherein the second electrode is fixed to the frame.

13. The filtering medium according to claim 8, wherein the first electrode is sandwiched between the first fiber layer and the second fiber layer.

14. The filtering medium according to claim 8, wherein the first electrode is sandwiched between the third fiber layer and the second fiber layer.

15. An air purifier comprising:
    a sucker of a gas;
    a discharger of the gas;
    the filtering medium according to claim 1 disposed between the sucker and the discharger; and
    an output terminal via which power is output to the first electrode.

16. An air purifier comprising:
    a sucker of a gas;
    a discharger of the gas;
    the filtering medium according to claim 8 disposed between the sucker and the discharger; and
    an output terminal via which power is output to the first electrode.

17. The filtering medium according to claim 1, wherein the fibers of the third fiber layer have an average fiber diameter of less than 1 μm.

18. The filtering medium according to claim 1, wherein:
    the first fiber layer contains first fibers,
    the second fiber layer contains second fibers, and
    the third fiber layer includes a composite layer formed of the first fibers and third fibers.

19. The filtering medium according to claim 8, wherein:
    the plurality of fiber layers includes a first fiber layer, a second fiber layer, and a third fiber layer, and
    the fibers of the third fiber layer have an average fiber diameter of less than 1 μm.

20. The filtering medium according to claim 8, wherein:
    the plurality of fiber layers includes a first fiber layer, a second fiber layer, and a third fiber layer,
    the first fiber layer contains first fibers,
    the second fiber layer contains second fibers, and
    the third fiber layer includes a composite layer formed of the first fibers and third fibers.

21. The filtering medium according to claim 8, wherein the first electrode has an input terminal of power, and wherein at least a part of the first electrode penetrates into voids of at least one selected from the plurality of fiber layers.

* * * * *